United States Patent
Zelinka et al.

(10) Patent No.: US 8,346,016 B1
(45) Date of Patent: Jan. 1, 2013

(54) LARGE-SCALE IMAGE PROCESSING USING MASS PARALLELIZATION TECHNIQUES

(75) Inventors: Stephen D. Zelinka, Mountain View, CA (US); Emil C. Praun, Fremont, CA (US); Chikai J. Ohazama, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/159,216

(22) Filed: Jun. 13, 2011

Related U.S. Application Data

(62) Division of application No. 11/437,553, filed on May 19, 2006, now Pat. No. 7,965,902.

(51) Int. Cl.
G06K 9/36 (2006.01)
H04N 5/225 (2006.01)

(52) U.S. Cl. .................................. 382/284; 348/218.1

(58) Field of Classification Search .................. 382/284
See application file for complete search history.

(56) References Cited

U.S. PATENT DOCUMENTS

| | | | |
|---|---|---|---|
| 2,818,211 A | 12/1957 | Macklem | |
| 5,030,117 A * | 7/1991 | Delorme | 434/130 |
| 5,581,637 A | 12/1996 | Cass et al. | |
| 5,652,717 A | 7/1997 | Miller et al. | |
| 5,778,092 A | 7/1998 | MacLeod et al. | |
| 5,796,868 A | 8/1998 | Dutta-Choudhry | |
| 5,987,189 A | 11/1999 | Schmucker et al. | |
| 6,005,978 A | 12/1999 | Garakani | |
| 6,075,567 A | 6/2000 | Ohnishi | |
| 6,075,905 A | 6/2000 | Herman et al. | |
| 6,188,804 B1 | 2/2001 | Weldy et al. | |
| 6,313,837 B1 | 11/2001 | Assa et al. | |
| 6,326,965 B1 | 12/2001 | Castelli et al. | |
| 6,359,617 B1 | 3/2002 | Xiong | |
| 6,363,392 B1 | 3/2002 | Halstead et al. | |
| 6,434,265 B1 | 8/2002 | Xiong et al. | |
| 6,453,233 B1 | 9/2002 | Kato | |
| 6,466,210 B1 | 10/2002 | Carlsen et al. | |
| 6,470,265 B1 | 10/2002 | Tanaka | |

(Continued)

OTHER PUBLICATIONS

Samet, Hanan et al., "Hierarchical Spatial Data Structures," Proc. of $1^{st}$ Symp. on Large Spatial Databases, Lecture Notes in Computer Science 409, Springer-Verlag, 1989, pp. 193-212.

(Continued)

*Primary Examiner* — David Zarka
(74) *Attorney, Agent, or Firm* — Fish & Richardson P.C.

(57) ABSTRACT

Assets of raw geo-located imagery can be divided into tiles and coverage masks can be generated for each tile. For each tile, fragments of pixels from coverage masks of neighboring tiles can be extracted and tagged. The fragments can be sorted and stored in a data structure so that fragments having the same tag can be grouped together in the data structure. The fragments can be used to feather the coverage mask of the tile to produce a blend mask. Multi-resolution imagery and mask pyramids can be generated by extracting fragments from tiles and minified (e.g., down-sampled). The minified fragments can be tagged (e.g., by ancestor tile name), sorted and stored in a data structure, so that fragments having like tags can be stored together in the data structure. The fragments can be assembled into fully minified tiles for each level in the pyramid. Input tiles in a first projection are re-projected into a second projection using techniques that minimize distortion in the re-projected imagery.

18 Claims, 12 Drawing Sheets

U.S. PATENT DOCUMENTS

| | | | |
|---|---|---|---|
| 6,470,344 B1 | 10/2002 | Kothuri et al. | |
| 6,493,021 B1 | 12/2002 | Rouge et al. | |
| 6,526,176 B1 | 2/2003 | Kovacevic et al. | |
| 6,591,004 B1 | 7/2003 | VanEssen et al. | |
| 6,625,611 B1 | 9/2003 | Teig et al. | |
| 6,684,219 B1 | 1/2004 | Shaw et al. | |
| 6,694,064 B1 | 2/2004 | Benkelman | |
| 6,720,997 B1 | 4/2004 | Horie et al. | |
| 6,732,120 B1 | 5/2004 | Du | |
| 6,735,348 B2 | 5/2004 | Dial, Jr. et al. | |
| 6,757,445 B1 | 6/2004 | Knopp | |
| 6,766,248 B2 | 7/2004 | Miyahara | |
| 6,842,638 B1 | 1/2005 | Suri et al. | |
| 6,882,853 B2 | 4/2005 | Meyers | |
| 6,917,711 B1 | 7/2005 | Wang et al. | |
| 6,985,903 B2 | 1/2006 | Biacs | |
| 6,985,929 B1 | 1/2006 | Wilson et al. | |
| 7,006,110 B2 | 2/2006 | Crisu et al. | |
| 7,103,237 B2 | 9/2006 | Labelle | |
| 7,138,998 B2 | 11/2006 | Forest et al. | |
| 7,190,839 B1 | 3/2007 | Feather et al. | |
| 7,248,965 B2 | 7/2007 | Tanizaki et al. | |
| 7,298,869 B1 | 11/2007 | Abernathy | |
| 7,490,084 B2 | 2/2009 | Kothuri et al. | |
| 7,519,603 B2 | 4/2009 | Parker | |
| 7,552,008 B2 | 6/2009 | Newstrom et al. | |
| 7,561,156 B2 | 7/2009 | Levanon et al. | |
| 7,689,621 B1 | 3/2010 | Huber et al. | |
| 2001/0039487 A1 | 11/2001 | Hammersley et al. | |
| 2002/0101438 A1 | 8/2002 | Ham et al. | |
| 2002/0141640 A1 | 10/2002 | Kraft | |
| 2002/0163582 A1 | 11/2002 | Gruber et al. | |
| 2003/0007078 A1* | 1/2003 | Feldis, III | 348/231.6 |
| 2003/0040970 A1 | 2/2003 | Miller | |
| 2003/0114173 A1 | 6/2003 | Carroll | |
| 2003/0179301 A1* | 9/2003 | Feldis et al. | 348/231.3 |
| 2004/0021770 A1 | 2/2004 | Krill | |
| 2004/0057633 A1 | 3/2004 | Mai et al. | |
| 2004/0081355 A1 | 4/2004 | Takahashi | |
| 2004/0095343 A1 | 5/2004 | Forest et al. | |
| 2004/0204849 A1* | 10/2004 | Shipley et al. | 701/212 |
| 2004/0234162 A1 | 11/2004 | Jalobeanu et al. | |
| 2004/0252880 A1 | 12/2004 | Takizawa et al. | |
| 2005/0041842 A1 | 2/2005 | Frakes et al. | |
| 2005/0091223 A1 | 4/2005 | Shaw et al. | |
| 2005/0109363 A1 | 5/2005 | Matsuoka | |
| 2005/0265631 A1 | 12/2005 | Mai et al. | |
| 2005/0270311 A1 | 12/2005 | Rasmussen et al. | |
| 2006/0143202 A1 | 6/2006 | Parker | |
| 2006/0184519 A1 | 8/2006 | Smartt | |
| 2006/0206264 A1* | 9/2006 | Rasmussen | 701/212 |
| 2006/0222079 A1 | 10/2006 | Park et al. | |
| 2007/0182734 A1 | 8/2007 | Levanon et al. | |
| 2007/0276970 A1 | 11/2007 | Werner et al. | |
| 2009/0074275 A1 | 3/2009 | O Ruanaidh | |

OTHER PUBLICATIONS

Barroso, Luiz Andre et al., "Web Search for a Planet: The Google Cluster Architecture," IEEE Micro, IEEE Computer Society, Mar.-Apr. 2003, pp. 22-28.

Dean, Jeffrey, et al. "MapReduce: Simplified Data Processing on Large Clusters," Symposium on Operating System Design (OSDI), Dec. 6-8, 2004, San Francisco, California, pp. 1-13.

Foley, James D. et al., Ch. 15, "Visible-Surface Determination," "Computer Graphics: Principals and Practice Second Edition in C," Addison-Wesley (2006), pp. 649-720.

Ghemawat, Sanjay et al., "The Google File System," Association for Computing Machinery (ACM), $19^{th}$ Symposium on Operating System Principles (SOSP), Oct. 19-22, 2003, Lake George, New York, 15 pages.

Grimm, Cindy, "Technical Report WUCS-2002-9: Creating View-dependent Texture Maps," Nov. 22, 2000, Washington University in St. Louis, Department of Computing Science, 9 pages.

Keyhole 2 Fusion Version 2.3 manual, Keyhole, Inc., 2005, 195 pages.

Langley, Richard, B. "The UTM Grid System," GPS World, Feb. 1998, pp. 46-50.

Lawder, J.K. et al., "Using Space-filling Curves for Multi-dimensional Indexing," School of Computer Science and Information Systems, Birkbeck College, University of London, Malet Street, London WC1E 7HX, United Kingdom, 16 pages, 2000.

Lindstrom, Peter et al., "An Integrated Global GIS and Visual Simulation System," Mar. 1997. Georgia Institute of Technology: Graphics, Visualization & Usability Center. Technical Report GIT-GVU-97-07, pp. 1-9.

Mesick, H., et al., "A Faster Technique for the Transformation of Universal Transverse Mercator Projected Raster Images into a Geodetic Projection," Naval Research Laboratory: Memorandum Report, Mar. 11, 2005, 16 pages.

Skodras, A., et al., T., "JPEG 2000 Still Image Compression Standard," IEEE Signal Processing Magazine, Sep. 2001, pp. 36-58.

U.S. Appl. No. 11/415,960, for "Coverage Mask Generation for Large Images", filed May 2, 2006.

U.S. Appl. No. 11/437,553, for "Large Scale Image Processing Using Mass Parallelization Techniques", filed May 19, 2006.

U.S. Appl. No. 11/473,461, for "Hierarchial Spatial Data Structure and 3D Data Versioning for Generating Packet Data", filed Jun. 22, 2006.

U.S. Appl. No. 11/539,149, for "Fast Updates of Imagery", filed Oct. 5, 2006.

* cited by examiner

LARGE-SCALE IMAGE PROCESSING USING MASS PARALLELIZATION TECHNIQUES

RELATED APPLICATION

This application is a divisional of, and claims priority to, U.S. patent application Ser. No. 11/437,553, entitled "Large-Scale Image Processing Using Mass Parallelization Techniques," filed May 19, 2006, of which U.S. patent application Ser. No. 11/437,553 is related to co-pending and jointly-owned U.S. patent application Ser. No. 11/415,960, entitled "Coverage Mask Generation For Large Images," filed May 2, 2006, all of which are incorporated by reference herein in their entirety.

TECHNICAL FIELD

The subject matter of this application is generally related to image processing.

BACKGROUND

Dramatic improvements in computer processing power and broadband streaming technology have lead to the development of interactive three-dimensional (3D) map systems for navigating the Earth. Interactive 3D map systems typically provide a user interface (UI) with navigation controls for dynamically navigating cities, neighborhoods and other terrain. The navigation controls enable users to tilt, pan, rotate and activate 3D terrain and buildings for different perspectives at a point of interest.

The production imagery used by interactive 3D map systems is typically derived by processing large pieces of geo-located imagery or "assets," which can be taken from a single pass of a satellite or stitched together from multiple aerial photos. Once the imagery is processed it can be moved to datacenters where it can be distributed to other devices. To ensure that accurate 3D maps are generated, the production imagery is periodically updated in the datacenters. Unfortunately, the updating of large scale satellite imagery (and terrain data) for the entire Earth can be a time consuming and laborious process.

SUMMARY

Assets of raw geo-located imagery can be divided into tiles or other shapes and coverage masks can be generated for each tile. For each tile, fragments of pixels from coverage masks of neighboring tiles can be extracted and tagged. The fragments can be sorted and stored in a data structure so that fragments having the same tag can be grouped together in the data structure. The fragments can be used to feather the coverage mask of the tile to produce a blend mask.

Multi-resolution imagery and mask pyramids can be generated by extracting fragments from tiles and minified (e.g., down-sampled). The minified fragments can be tagged (e.g., by ancestor tile name), sorted and stored in a data structure, so that fragments having like tags can be stored together in the data structure. The fragments can be assembled into fully minified tiles for each level in the image pyramids.

Output tiles from the processes described above can be output into a first projection (e.g., latitude/longitude). The first projection can be re-projected into a second projection (e.g., a Mercator projection) using techniques that minimize distortion in the re-projected imagery.

In some implementations, a method of generating a blend mask includes: dividing imagery into tiles; retrieving a coverage mask associated with a tile defining the location of imagery in the tile, where the tile is at least partially surrounded by neighboring tiles; extracting image fragments from coverage masks associated with the neighboring tiles; tagging the image fragments; organizing the image fragments into groups by tags; and feathering the boundaries of the coverage masks using fragments having the same tags to generate a blend mask for the tile.

In some implementations, a method of generating a multi-resolution image pyramid includes: dividing imagery into tiles; for each resolution level in the image pyramid, generating a minified fragment from each tile; tagging the minified fragments with ancestor tile identifiers; grouping fragments with the same tag; and compositing minified fragments with the same tag to produce minified tiles at each level of the image pyramid.

In some implementations, an imagery re-projection method includes: dicing imagery in a first projection into tiles; for each tile, determining output resolution levels to which the tile will be mapped; generating fragments from the tiles for each output level; tagging the fragments with output tile identifiers; grouping fragments with the same tag; and assembling fragments with the same tag to produce output tiles in a second projection.

Other implementations of large-scale image processing using mass parallelization techniques are disclosed, including implementations directed to systems, methods, apparatuses and computer-readable mediums.

DETAILED DESCRIPTION

Exemplary Interactive 3D Mapping System

Figure 1:
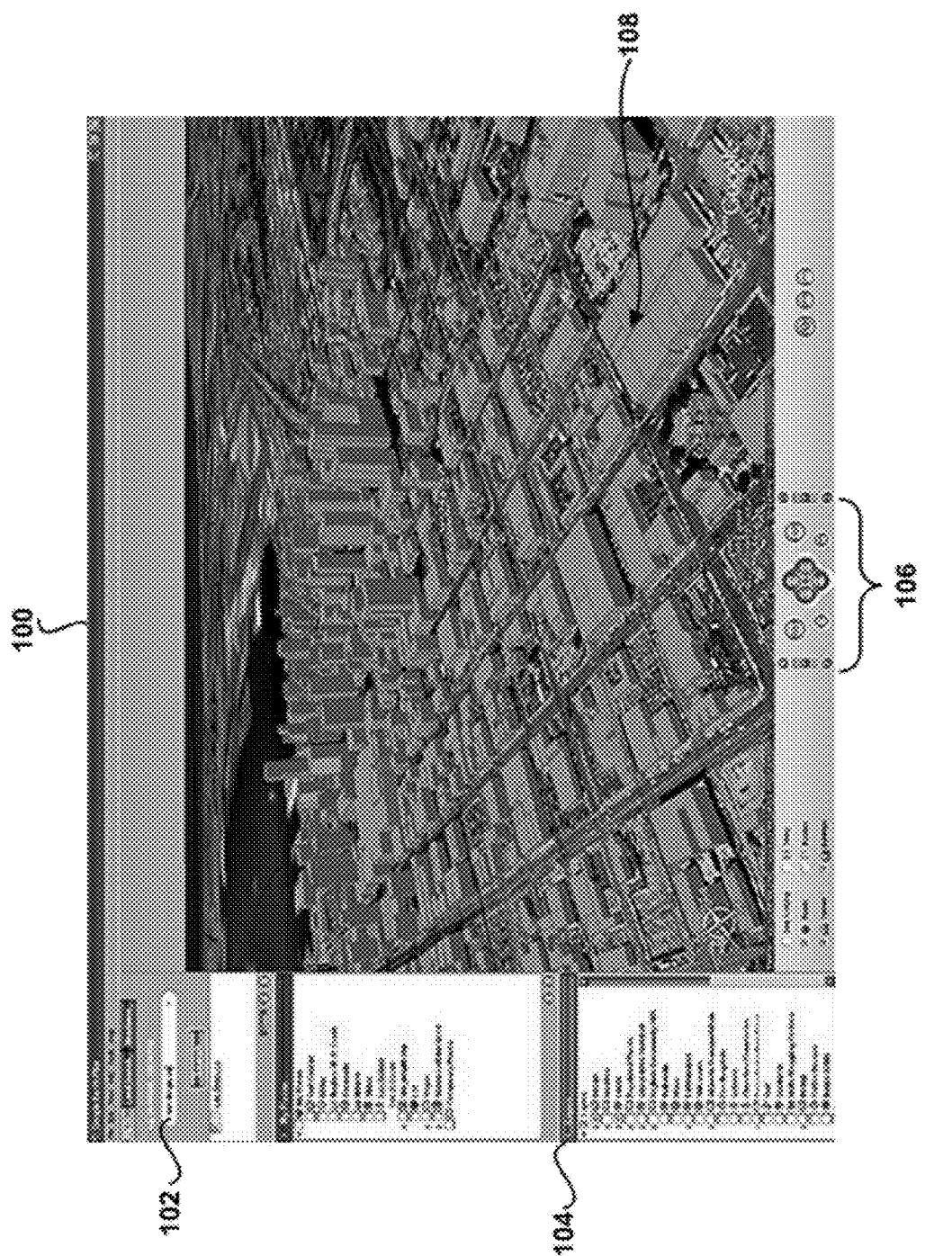
FIG. 1 is a screenshot of an exemplary UI for an interactive 3D Earth mapping system.

FIG. 1 is a screenshot of an exemplary UI 100 for an interactive 3D map system for navigating the Earth. One example of an interactive 3D map system for navigating the Earth is Google Earth™, developed by Google Inc. (Mountain View, Calif.). The UI 100 allows a user to enter a desired location in a search box 102, and then presents imagery of the selected location in a display area 108. A selection pane 104 allows the user to specify one or more layers of information to be displayed with the imagery (e.g., terrain, dining, lodging, gas stations, park and recreation areas, airports and transportation, etc.). The user can operate navigation controls 106 to tilt, pan, rotate and zoom imagery presented in the display area 108 to change the perspective at the selected location.

In some implementations, the UI 100 is generated and presented by a user device. A client application on the user device can communicate with one or more datacenters over a network (e.g., the Internet, intranet, wireless network, etc.) to retrieve imagery and associated meta-data from one or more server systems in the datacenters. Such a client/server architecture reduces the amount of data that a user device stores locally to operate the interactive 3D map system. The imagery provided by datacenters can be generated from raw satellite imagery and other information (e.g., terrain data, vector data, etc.) which is processed before being served to user devices, as described with respect to FIG. 2.

Image Processing and Delivery System

Figure 2:
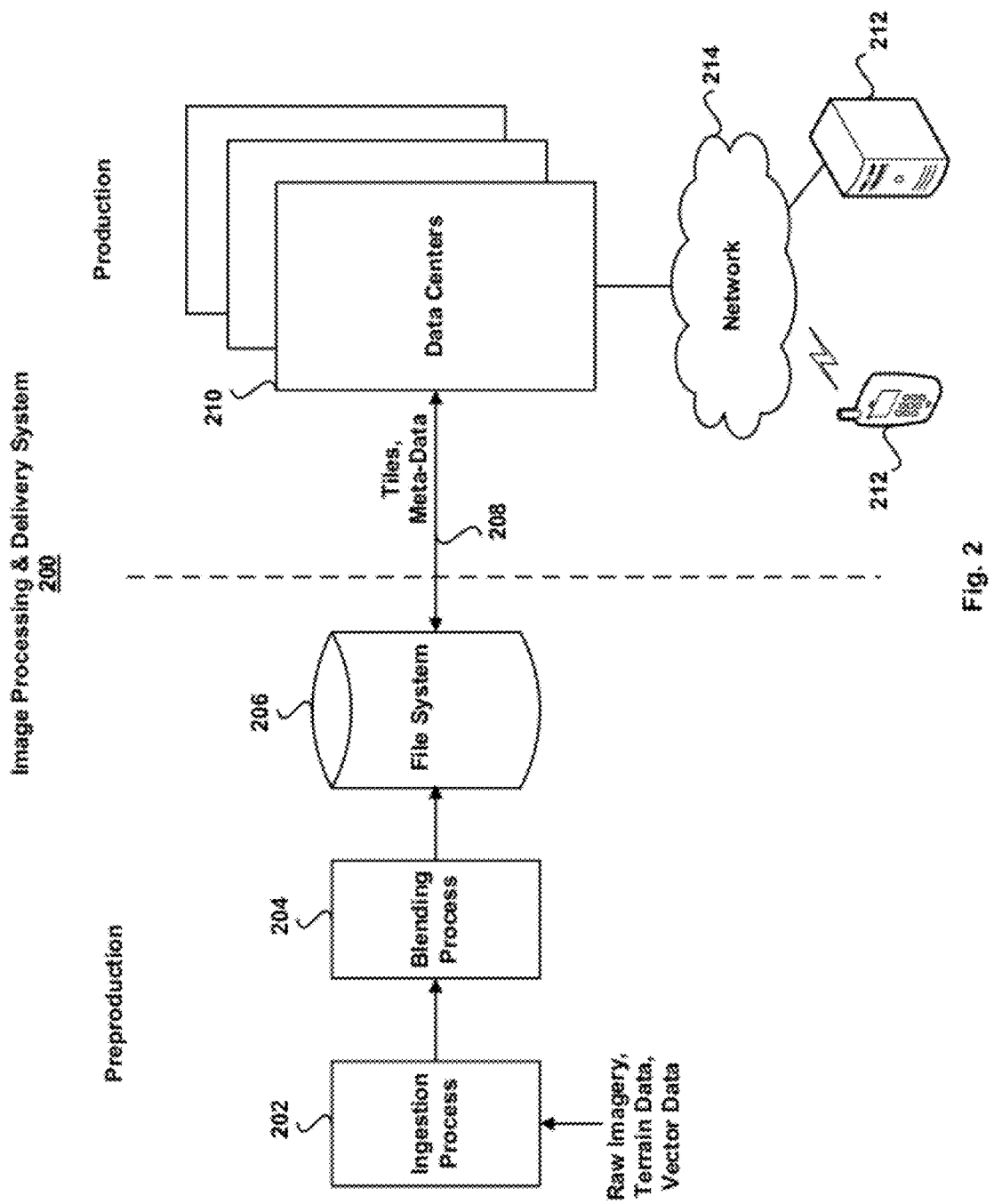
FIG. 2 is a block diagram of an exemplary image processing and delivery system for processing and delivering map imagery to user devices.

FIG. 2 is a block diagram of an exemplary image processing and delivery system 200 for processing and delivering map imagery and associated meta-data to user devices 212. In some implementations, the system 200 includes a preproduction phase and a production phase. The preproduction phase includes an ingestion process 202 and a blending process 204. The ingestion process 202 performs various image processing on raw imagery, including but not limited: to re-projection, tile generation, coverage and blend mask generation and multi-resolution image and mask pyramid generation, etc. Each of these processes are described more fully with respect FIG. 3.

In some implementations, the blending process 204 orders and blends together processed images generated by the ingestion process 202. The blended image products are made available to datacenters 210 through a file system 206 and a delivery channel 208. The preproduction phase can be implemented using mass parallelization techniques, as described with respect to FIG. 3.

In the production phase, one or more datacenters 210 retrieve the image products from the file system 206 and deliver the image products to user devices 212 through a network 214 (e.g., Internet, intranet, Ethernet, wireless network, etc.). The image products can include imagery and associated meta-data for one or more locations on the Earth. An exemplary file system 206 can be Google Inc.'s Global File System (GFS), as described in Ghemawat, Sanjay et al., "The Google File System," Association For Computing Machinery (ACM), 19th Symposium On Operating System Principles (SOSP), Oct. 19-22, 2003, Lake George, N.Y., which article is incorporated by reference herein in its entirety.

User devices 212 can be any electronic device capable of displaying a map, including but not limited to: personal computers (portable or desktop), mobile phones, smart phones, personal digital assistants (PDAs), game consoles, high definition televisions, set-top boxes, navigation systems (e.g., global positioning system (GPS)), avionics displays, etc. The system 200 is exemplary and other configurations and arrangements for image processing and delivery are possible. For example, the ingestion and blending processes could be performed in the datacenters. Also, the tile imagery and meta-data could be provided to the datacenters by different sources.

Exemplary Ingestion Process

Figure 3:
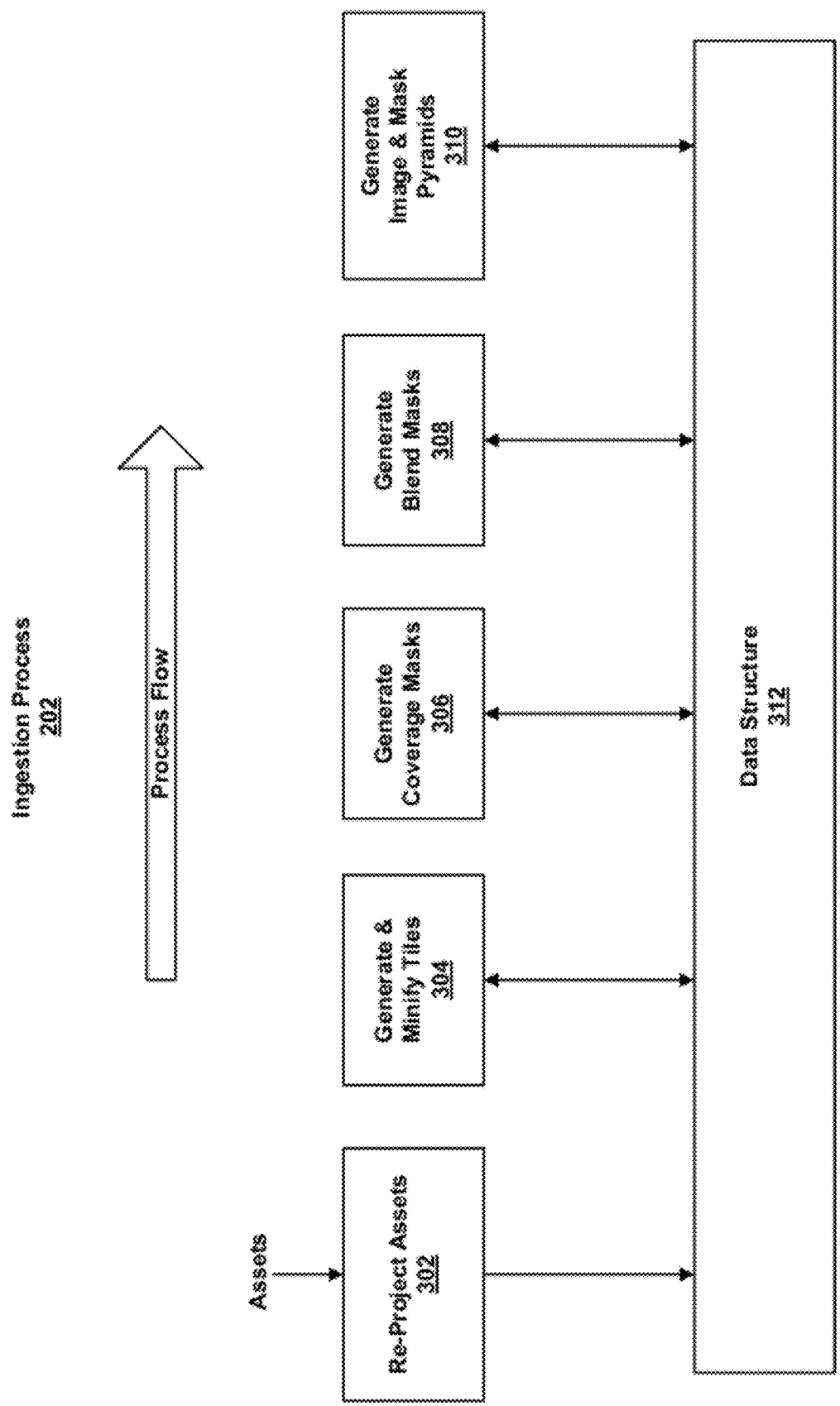
FIG. 3 is a flow diagram of an exemplary ingestion process.

FIG. 3 is a flow diagram of the ingestion process 202 described with respect to FIG. 2. In some implementations, the ingestion process 202 is implemented in a parallel processing infrastructure, which can include hundreds or thousands of commodity computers that are interconnected and configured to perform various image processing operations in parallel.

Large pieces of geo-located imagery are taken from a single pass of a satellite or are stitched together from multiple aerial photos. These raw images or "assets" can be received from one or more sources and can have a variety of orientations. The assets can be re-projected 302 into a suitable coordinate system for the map system (e.g., a geospatial coordinate system) and stored in one or more data structures 312 (e.g., database table). In some implementations, the re-projected assets are divided 304 into tiles which are processed independently in a parallel processing infrastructure. Ideally, tiles are stored so tiles that include imagery for geographic locations that are close to each other have a high probability of being stored on the same machine or in the same machine cluster to reduce the overhead associated with accessing information located on multiple machines. To achieve this ideal condition, the tiles can be sized to fall within the storage constraints of the machines or a cluster of machines. The assets can be divided into any desired shape. A tile shape, however, typically requires less computational and/or representational overhead during processing.

Figure 4B:
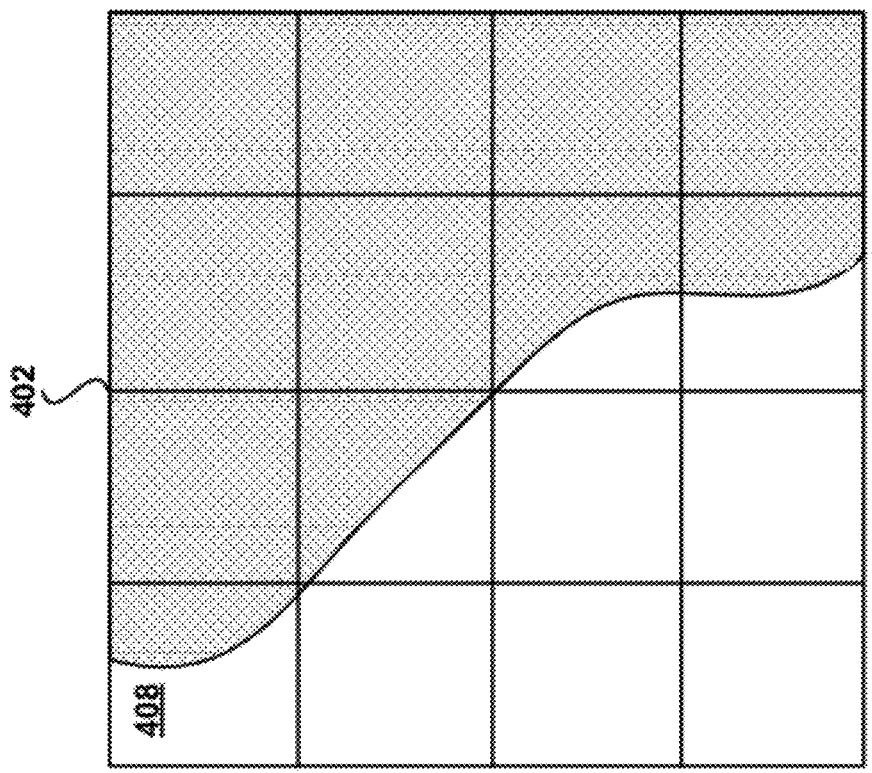
FIGS. 4A and 4B illustrate an exemplary tiling process for efficiently processing raw imagery using mass parallelization techniques.
Figure 4A:
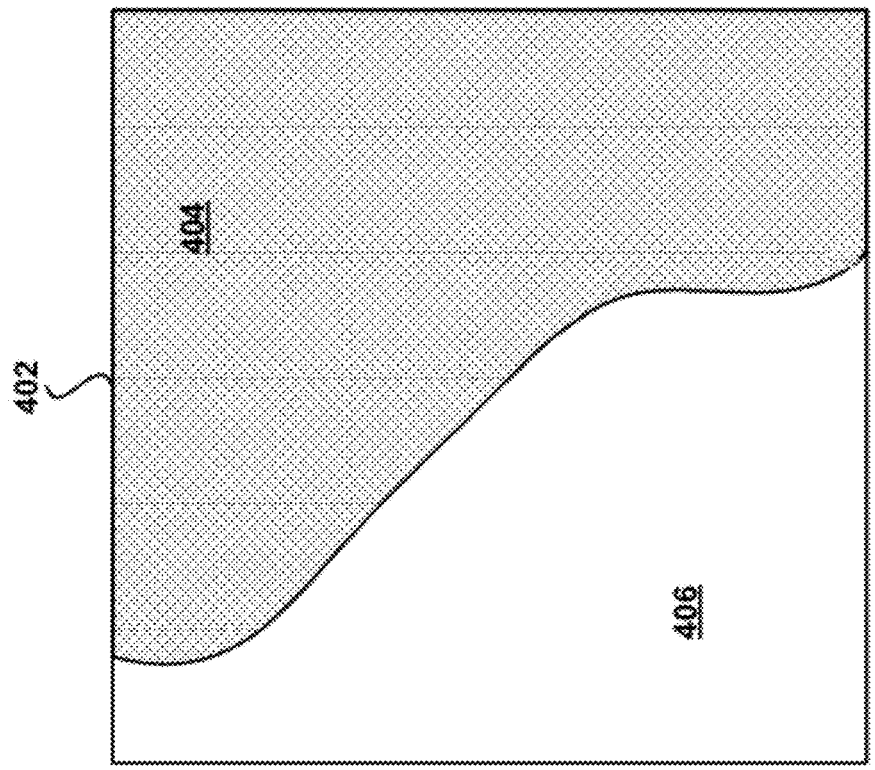

FIGS. 4A and 4B further illustrate the tile generation process 304. A typical asset 402 can include a data region 404 (e.g., imagery) and a no-data region 406. The asset 402 can be divided into tiles 408 as shown in FIG. 4B. Note that tiles 408 can include data regions 404, no-data regions 406 or a mix of data regions 404 and no-data regions 406. It is typically not desirable to process no-data regions 406 because such regions can result in poor image quality. The removal of no-data regions 406 from further processing can be achieved using coverage masks, as previously described. Some exemplary techniques for generating coverage masks are described in U.S. patent application Ser. No. 11/415,960, entitled "Coverage Mask Generation For Large Images."

After an asset is re-projected and divided into tiles, the tiles can be minified (i.e., down-sampled) and stored in the data structure 312. The size of a minified tile can be selected so that the minified tile can fit into the memory of a single machine to facilitate efficient parallel processing, as previously described.

A coverage mask can be generated 306 for each minified tile and stored in the data structure 312. A coverage mask is essentially a 2D mask through which the imagery can be seen. Optionally, an "alpha" value can be associated with each mask for fading the imagery during the blending process 204. A coverage mask can be, for example, a binary file that contains a binary number for each pixel in a tile. A binary "1" can indicate the presence of imagery in a pixel and a binary "0" can indicate the absence of imagery in a pixel. When the coverage mask is mapped to its associated processing tile, the pixels that do not contain imagery can be masked out.

After the coverage masks are generated they can be feathered into blend masks and stored in the data structure 312. The blend masks can be used to feather the boundaries of high-resolution imagery against coarser resolution imagery during the blending process 204. The feathering of coverage masks can be done by replacing each pixel with a function of the average of other pixels in a small box around the pixel, as described with respect to FIG. 6. For pixels close to the edge of a tile, the filtering box may contain pixels from neighboring tiles. After the blend masks are generated, multi-resolution image and mask pyramids are generated 310 for multiple levels of resolution, as described with respect to FIG. 9.

Exemplary Refined Mask Feathering Process

Figure 5:
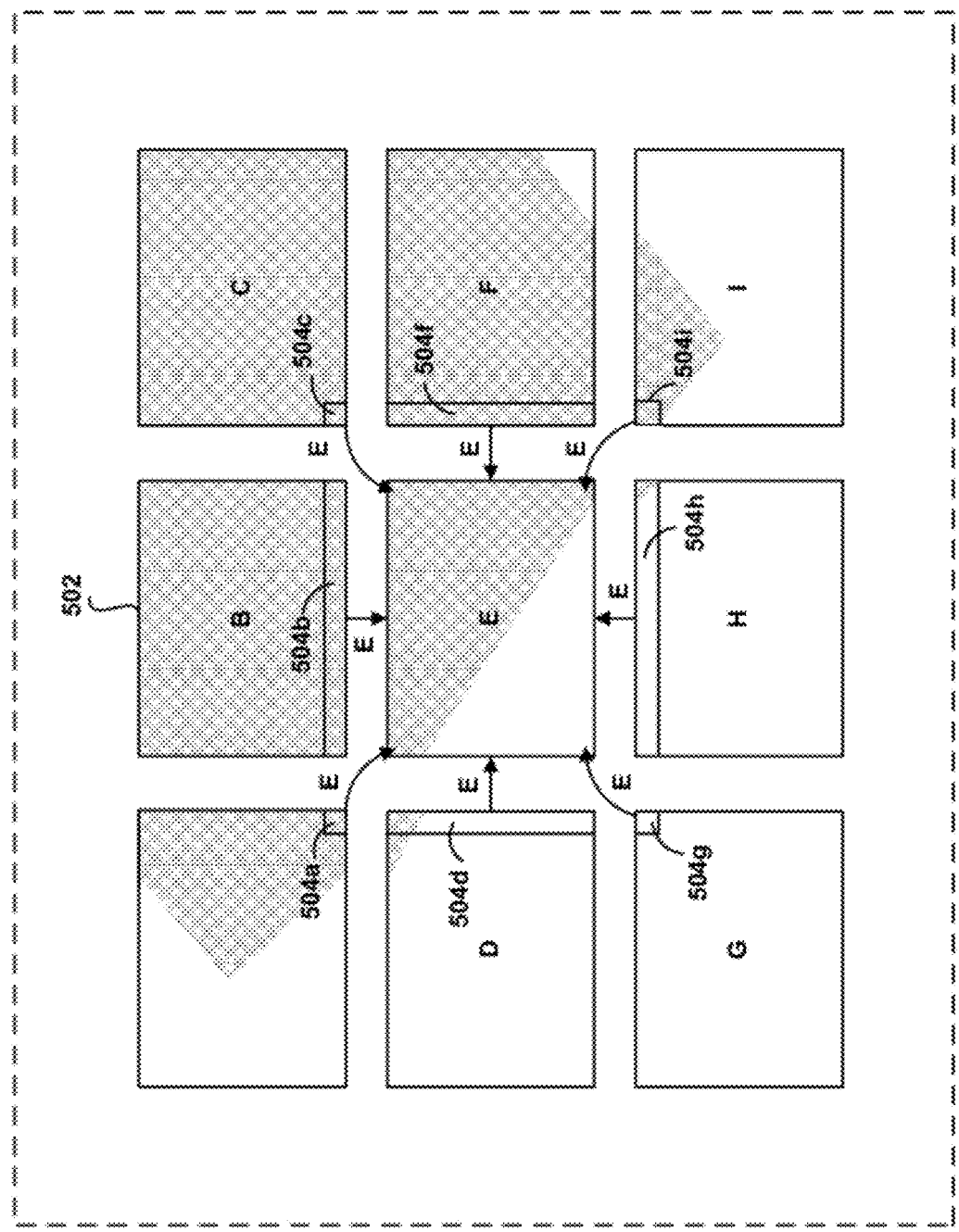
FIG. 5 illustrates an exemplary refined mask feathering process using mass parallelization techniques.

FIG. 5 illustrates an exemplary refined mask feathering process using mass parallelization techniques. During the blending process 204, a blend mask is used to feather the transition between assets. When blending high-resolution imagery with low-resolution imagery it is desirable that the opacity of image boundaries of the blend mask gradually taper from fully opaque to fully transparent. In some implementations, the coverage mask for each tile can be feathered into a blend mask using pixels from neighboring tiles. The union of the pixels needed to feather a given tile is a set of fragments to be extracted from the coverage masks of neighboring tiles. For example, to feather the mask in Tile E, we need fragment 504a from Tile A, fragment 504b from Tile B and so forth. Each of the neighboring Tiles A, B, C, D, F, G, H and I can contribute fragments 504a, 504b, 504c, 504d, 504f, 504g, 504h and 504i, from their respective coverage masks for feathering the coverage mask of Tile E into a blend mask for Tile E. Note that the coverage masks for Tiles A, C, G and I each contribute a corner fragment to the feathering of the coverage mask for Tile E.

Figure 6:
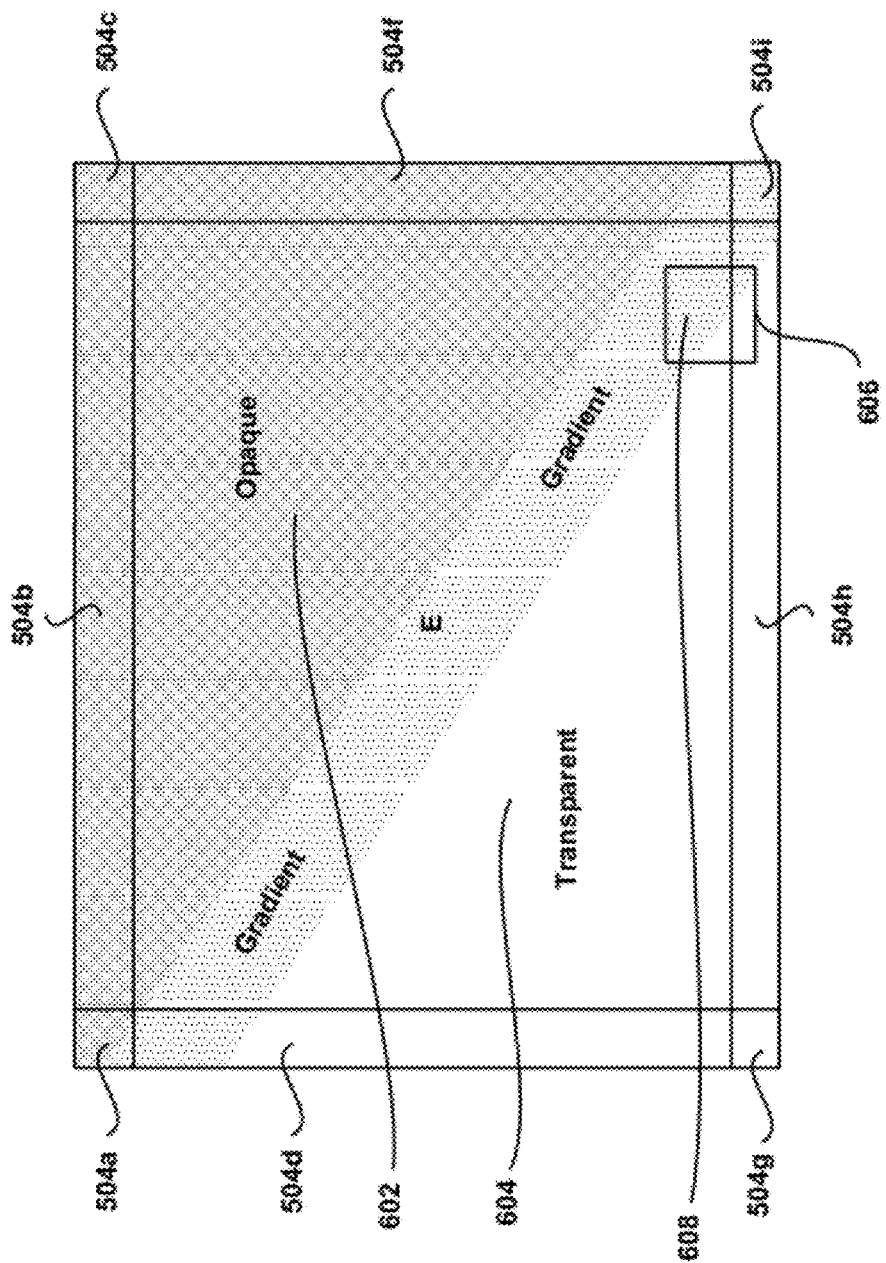
FIG. 6 further illustrates the refined mask feathering process illustrated in FIG. 5.

FIG. 6 further illustrates the refined mask feathering process described in reference to FIG. 5. In some implementations, a coverage mask, together with the fragments from neighboring tiles, can include pixels in transparent regions 602, opaque regions 604 and boundary regions 608. The opaque regions 604 indicate the presence of imagery and the transparent regions 602 indicate the absence of imagery. If a binary mask is used, then 1s can indicate the presence of imagery and 0s can indicate the absence of imagery. Feathering will smooth the transition between 0 and 1, producing a gradient in the boundary region 608 with fractionary values between 0 and 1.

During feathering, the fragments 504a, 504b, 504c, 504d, 504f, 504g, 504h, 504i, that contribute are assembled with the coverage mask for Tile E. In this example, the fragments 504a, 504b, 504c, 504d, 504f, 504g, 504h, 504i, extracted from coverage masks for neighboring Tiles A-D and F-I, are assembled around the coverage mask for Tile E. A mask feathering filter 606 is used to average or smooth all the pixel values. The pixels that are surrounded by neighboring pixels of the same value can remain unchanged, while pixels that are surrounded by neighboring pixels with value 0 and neighboring pixels with value 1 can be assigned a fractionary value between 0 and 1, as a result of the averaging process. Note that each of the fragments 504a, 504b, 504c, 504d, 504f, 504g, 504h, 504i can contribute a value to the average calculation. Any suitable known mask feathering filter can be used (e.g., Gaussian blur filter).

In some implementations, simple averaging can be performed using summed area tables or other acceleration structures. In the simple averaging process, pixel values are not directly averaged since directly averaging pixel values can transform pixels that have no image data (e.g., coverage mask=0) into pixels with fractionary blend values which could blend in regions with no data. Instead, only pixels values within the coverage mask are averaged. If the average pixel value is below a threshold value (e.g., 0.6), the pixel can become fully transparent (e.g., blend mask=0). If the average pixel value is within a predetermined range (e.g., between 0.6 and 1.0), then the resulting blend mask can be set to a value between 0 and 1. Upon completion of the feathering process, the fragments 504a, 504b, 504c, 504d, 504f, 504g, 504h, 504i, are extracted and the coverage mask for Tile E (with feathered edges) is stored in the data structure 312 for use as a blend mask in the blending process 204.

Exemplary Refined Mask Feathering Process Flow

Figure 7:
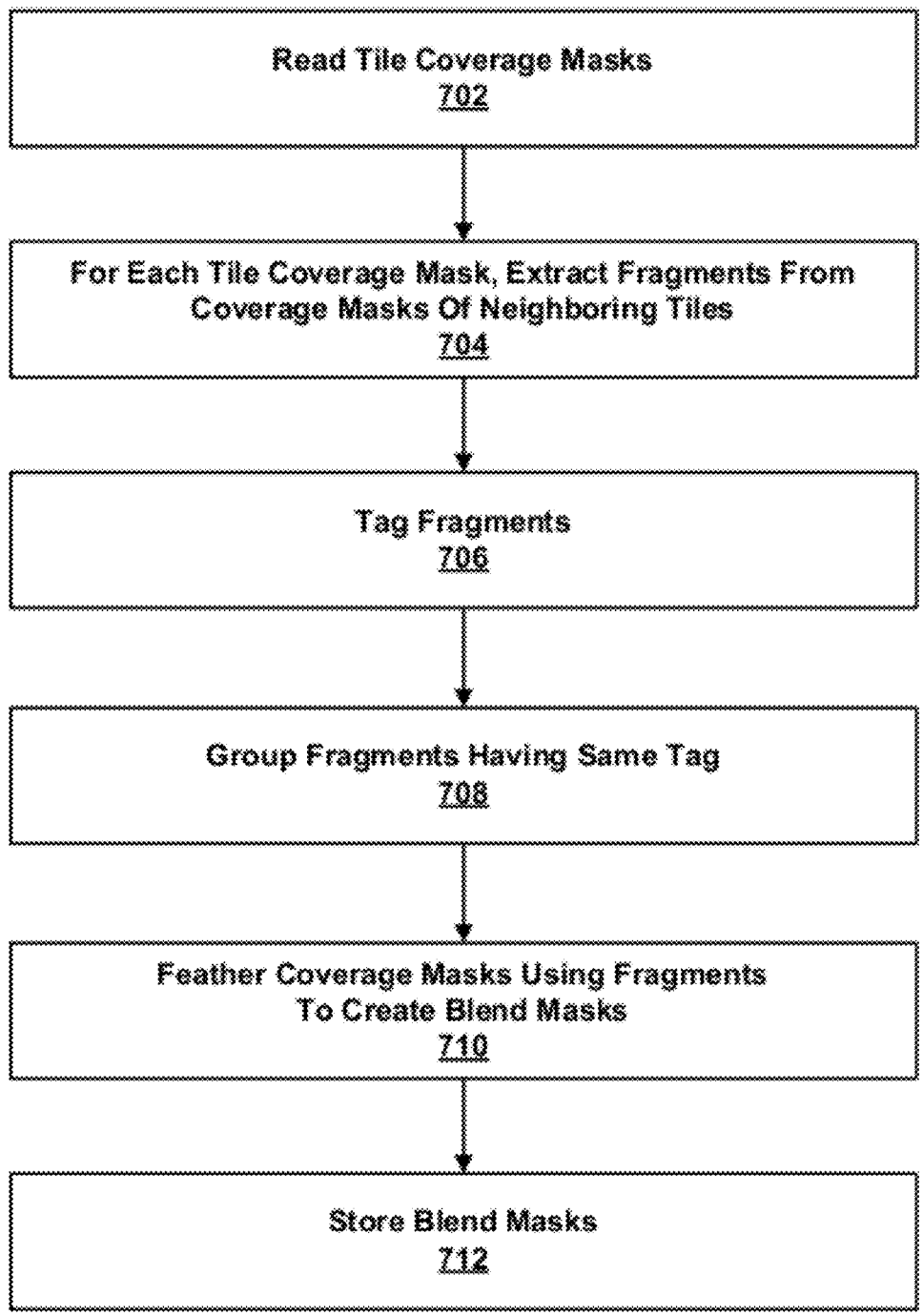
FIG. 7 is a flow diagram of the refined mask feathering process illustrated in FIGS. 5 and 6.

FIG. 7 is a flow diagram of a refined feathering process 700. The process 700 begins by reading tile coverage masks (702). For each tile, fragments of pixels are extracted from the coverage masks of neighboring tiles (704), as shown in FIG. 5. The edge fragments can have dimensions t by f and the corner fragments can have the dimensions f by f, where t is the tile size and (2*f+1) is the size of the feathering filter that is used to feather the coverage mask into a blend mask. Other dimensions are possible. In some implementations, the blend mask has a value between 0 and 1 at each pixel indicating the opacity of the corresponding image pixel (e.g., 1 is opaque, 0 is transparent). The blend mask can be stored fixed point, one byte per pixel, where 255 is opaque and 0 is transparent.

Each fragment can be tagged by destination using a neighboring tile ID or key (706). In the example of FIG. 5, each fragment is tagged with the tile ID "E" to associate the fragment with the Tile E. In practice, the tile ID or key can be a string, integer or any other desired data type. Fragments with the same tag are grouped together (708). Grouping (e.g., sorting) the fragments by tags allows the fragments having the same tag to be stored together in the data structure 312. When a tile coverage mask requires feathering (e.g., when new imagery is added to the tile), the neighboring tile fragments are made available to the processing machine (e.g., through the data structure 312) without the processing machine having to read each neighboring tile in its entirety each time a coverage mask is feathered. In some implementations, the fragments can be grouped together using a sorter or similar process. An exemplary sorter that is suitable for use in a parallel processing infrastructure is described in Dean, Jeffrey et al. "MapReduce: Simplified Data Processing on Large Clusters," Operating System Design and Implementation (OSDI) 2004, San Francisco, Calif., which is incorporated by reference herein in its entirety.

After the fragments are tagged and sorted, the fragments can be used by a machine in a parallel processing infrastructure to feather the boundaries of a tile coverage mask using, for example, a mask feathering filter (710). The mask feathering filter can be, for example, a low pass filter that averages pixels in the coverage mask and the fragments so that the boundaries of the coverage masks gradually taper from fully opaque to fully transparent.

The feathered coverage mask (i.e., a blend mask) can be stored separately from its associated imagery to avoid damage to the imagery caused by, for example, additional compression. The blend mask can be stored losslessly since it usually consists of low-frequency data and compresses well. By storing the blend mask separately, the feathering parameters (e.g., the width of the feathered region) can be changed without affecting the imagery.

In some implementations, the blend mask can be used in an extra culling round before retrieving the imagery for blending. For example, at blend time if only a small portion of a tile is left un-opaque after a few high-resolution assets have been blended, it is possible that by looking at the blend mask a determination can be made that blending a lower-resolution asset will not touch the "available" part of the tile, and thereby avoid reading or decoding its associated imagery.

Multi-Resolution Image and Mask Pyramid Generation

Figure 8A:
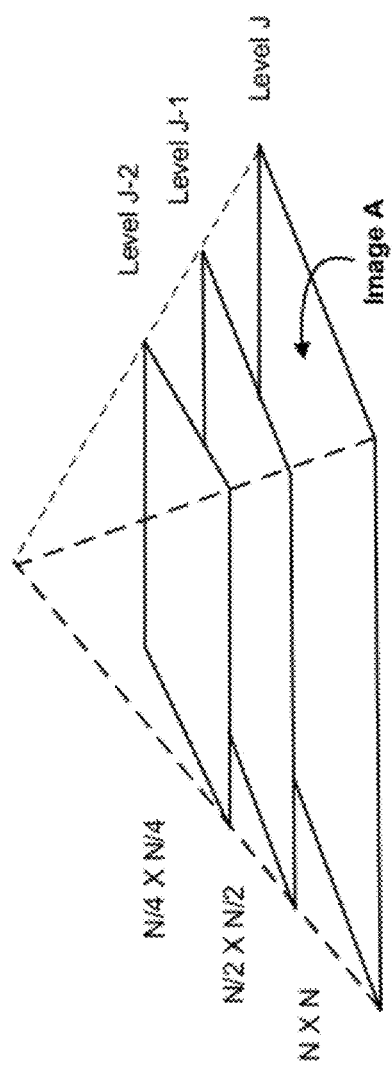
FIGS. 8A and 8B illustrate an exemplary process for generating multi-resolution image pyramids.
Figure 8B:
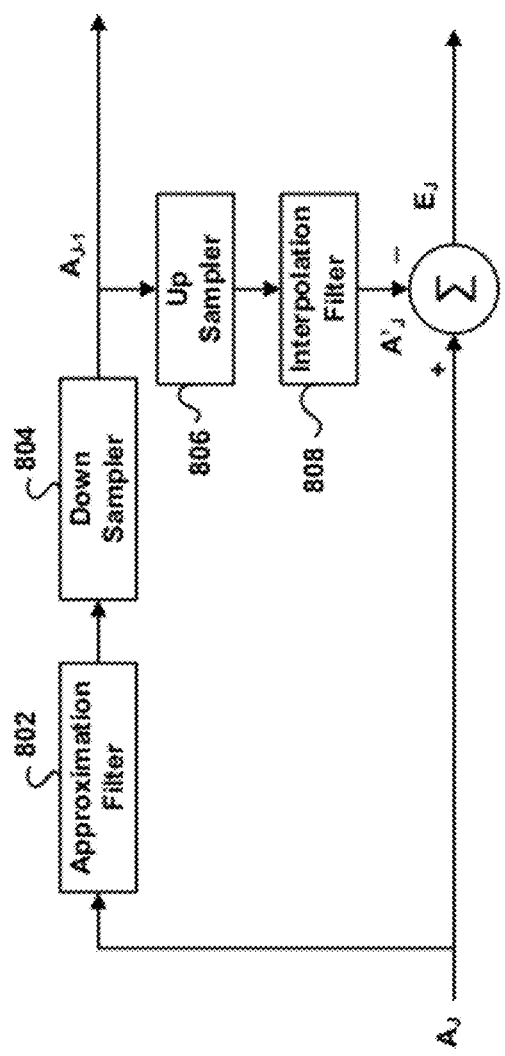

FIGS. 8A and 8B illustrate an exemplary process for generating multi-resolution image pyramids. As illustrated in FIG. 8A, the source imagery is "minified" (i.e., downsampled or upsampled) to a desired number of resolution levels forming a pyramid structure. Multi-resolution image pyramids allow users of interactive 3D map systems to zoom in and out of imagery.

FIG. 8B is a system block diagram of a conventional process for creating a multi-resolution image pyramid. In some implementations, an image A of size N×N (Level J) can be downsampled to a finer image $A_{J-1}$ (Level J-1) of size N/2× N/2 using an approximation filter 802 (e.g., low pass filter) and a downsampler 804, where $N=2^J$. Similarly, the image $A_{J-1}$ can be down sampled to a finer image $A_{J-2}$ (e.g., Level J-2) of size N/4×N/4. For example, if the original image A is 1024×1024 pixels in size and is downsampled once, the result is a 512×512 pixel image. If the original image A is downsampled twice, the result is a 256×256 pixel image.

An approximation A' of image A can be constructed with an upsampler 806 and an interpolator filter 808. The approximation image A' can then be subtracted from the original image A to generate a prediction residual $E_J=A-A'$. The original image A can be reconstructed using $A_{J-1}$ and $E_J$. Other levels can be generated by downsampling or upsampling as needed.

Figure 8C:
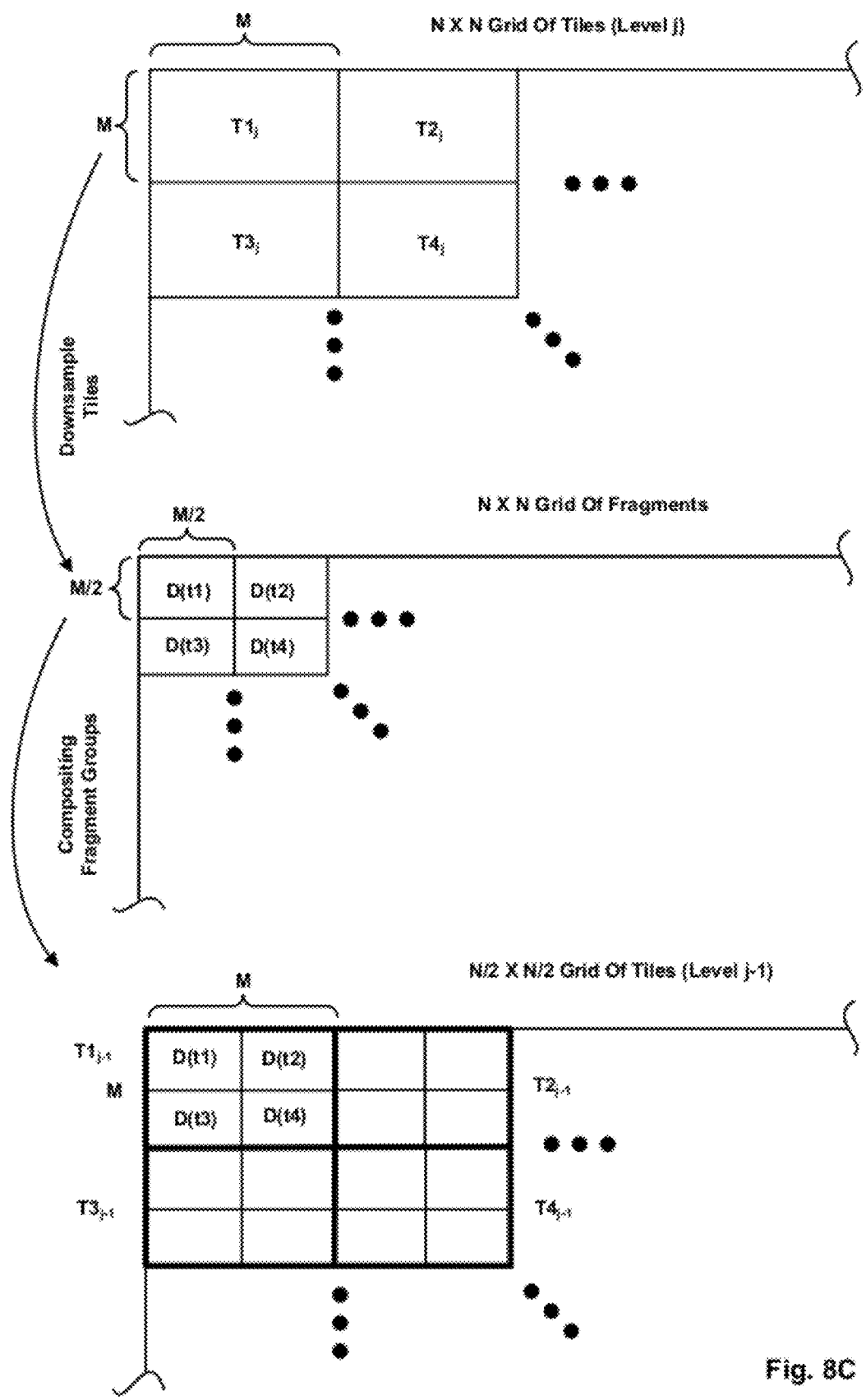
FIG. 8C illustrates an exemplary process for generating multi-resolution image pyramids using mass parallelization techniques.

FIG. 8C illustrates an exemplary process for generating multi-resolution image pyramids using mass parallelization techniques. To leverage mass parallelization techniques, an image can be diced into k tiles $t1_j, t2_j, t3_j, t4_j, \ldots, tk_j$, where each tile is of size M×M and j is the level of the multi-resolution image pyramid. The tiles can be downsampled, producing an N×N grid of fragments D(t1), D(t2), D(t3), D(t4), ..., D(tk), where D(.) is a downsampling operator. Groups of fragments (e.g., a 2×2 group of fragments) can be composited, producing an N/2×N/2 grid of M×M tiles containing the downsampled imagery at level j-1 of the multi-resolution image pyramid. This process is for one level of downsampling and can be extended to other levels to build a multi-resolution pyramid, as described below.

The pyramid building process is best described by example using actual numbers for dimensions. It should be apparent, however, that the numbers described are only examples and that actual dimensions can differ. During image pyramid generation, a 1024×1024 image can be divided into tiles having 8×8 pixels to form a grid of 128×128 tiles. To get the original 1024×1024 image downsampled once, the 8×8 tiles can be composited back into the 1024×1024 image and downsampled to a 512×512 image. The 512×512 image can then be divided into 8×8 tiles forming a grid of 64×64 tiles.

This approach can be improved by downsampling each of the original 8×8 tiles, producing a 128×128 grid of fragments, where each fragment includes 4×4 pixels. Each 2×2 group of fragments can be composited together. Note that in this example each fragment includes 4×4 pixels, so a 2×2 composite of fragments will include 8×8 pixels. Thus, a fragment is an entire finest-level tile downsampled to a lower resolution.

In this example, each original, high-resolution 8×8 tile knows exactly which ancestor it will contribute to. For example, the tile at row 48, column 33 (numbered from the top left in the 128×128 grid) will contributed to the upper right quadrant of the tile at row 24, column 16 in the downsampled 64×64 grid. That is, to construct a downsampled tile at row 24, column 16, in the 64×64 grid, the system needs to downsample the imagery from tiles (48, 32), (48, 33), (49, 32) and (49, 33) in the full resolution grid (the 128×128 grid), where the numbers in the parenthesis are the row and column of the tile in the full resolution grid.

Since each finest level tile knows which downsampled ancestor tile it will contribute to, the downsampled fragment can be tagged with the ancestor tile ID (e.g., a unique string identifying the tile). The tagged fragments can be sorted to group or cluster together fragments with the same tags (i.e., all the fragments for a particular ancestor tile), and the fragments can be composited into a fully minified tile. Note that each fragment also knows its respective position (i.e., quadrant) in the ancestor tile. An exemplary sorter that is suitable for use in a parallel processing infrastructure is described in Dean, Jeffrey et al. "MapReduce: Simplified Data Processing on Large Clusters."

The process described above produces one level of the multi-resolution image pyramid. To generate an entire pyramid, each 8×8 tile outputs a 2×2 fragment in addition to the 4×4 fragment, where the 2×2 fragment has been downsampled twice, and also a 1×1 fragment (downsampled three times), and so forth. In our example, the tile at row 48, column 33 in the original 128×128 grid, the 2×2 fragment would contribute to (12, 8) in the 32×32 grid (corresponding to the original image downsampled twice, or 256×256 total resolution), and the 1×1 fragment would go to (6,4) in the 16×16 grid (original image downsampled three times, or 128×128 total resolution). The sorting step works the same as before except for successively higher levels in the image pyramid, there is more a more fragments that end up contributing to each output tile. For example, for each output tile in the 32×32 grid, fragments from 16 original tiles will contribute, in the 16×16 grid, each tile will get fragments from 64 original tiles.

In some implementations, the blend masks associated with the tiles are also minified using known averaging techniques, and the imagery is downsampled using weighting from the minified blend mask. The weighting prevents no-data pixels from contributing artifacts (e.g., "black creep") to the minified tiles, while fully retaining and anti-aliasing the data present in the original image.

Figure 9:
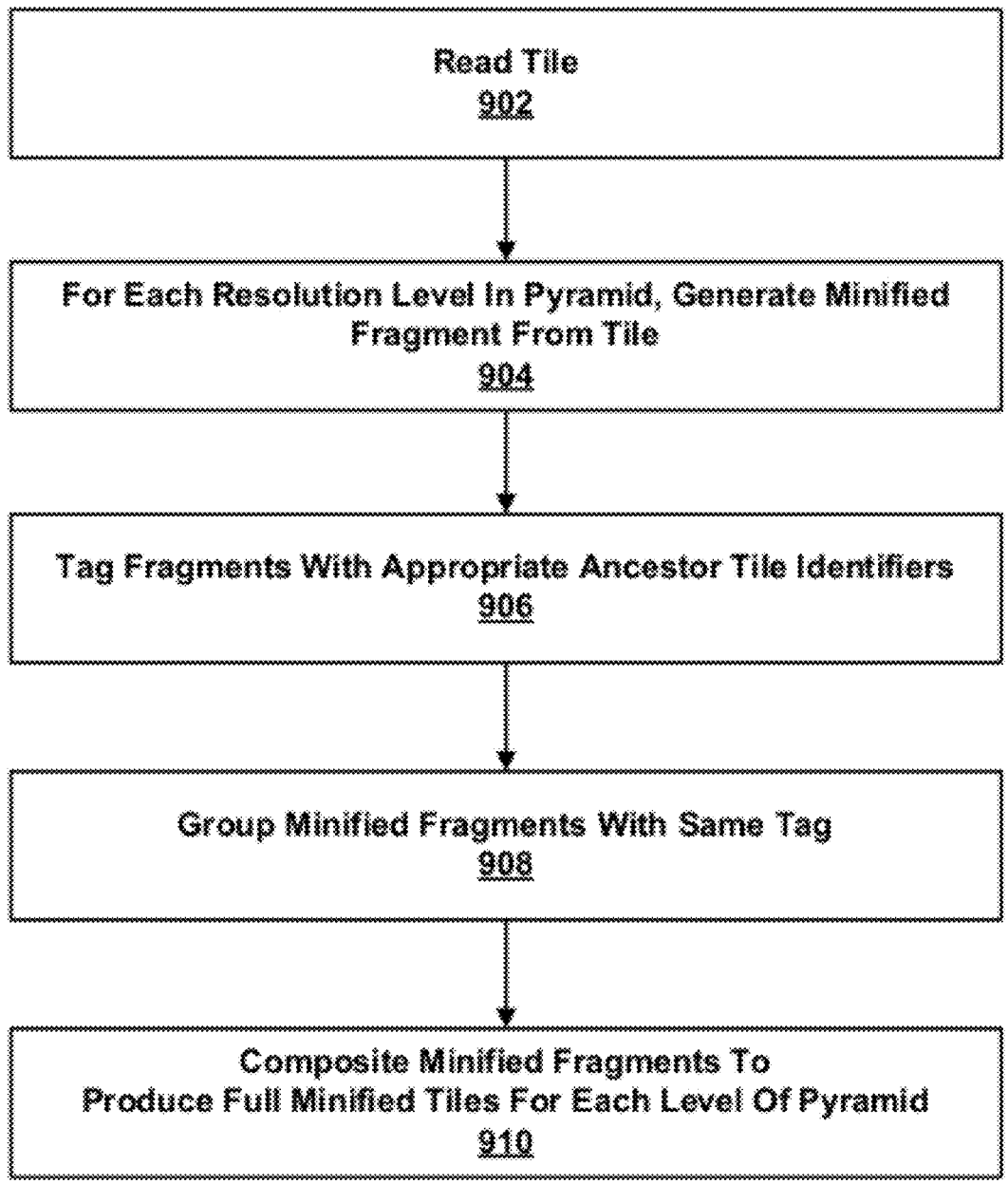
FIG. 9 is a flow diagram of the multi-resolution image pyramid generation process illustrated in FIG. 8C.

FIG. 9 is a flow diagram of the multi-resolution image pyramid generation process 900, described with respect to FIG. 8C. The process 900 begins by reading a tile from a data structure (902), such as the data structure 312 shown in FIG. 1. For each resolution level in the image pyramid, a single minified fragment is extracted from the tile (904). The fragments are tagged with appropriate tile identifiers (906) (e.g., ancestor tile IDs or names) and grouped by tag (908). In some implementations, sorting by tag results in the grouping of fragments having the same tag. The minified fragments can then be composited to produce full minified files at each level of the pyramid (910).

Re-Projection of Tile Imagery Into New Coordinate System

Figure 10C:
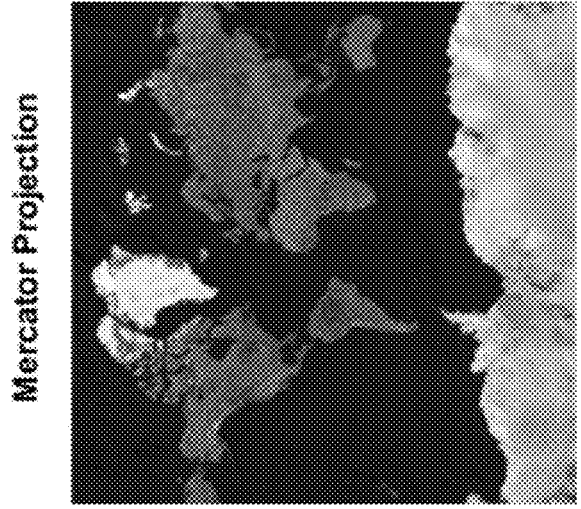
FIGS. 10A-10C illustrate distortion of imagery when mapping between two coordinate systems.
Figure 10B:
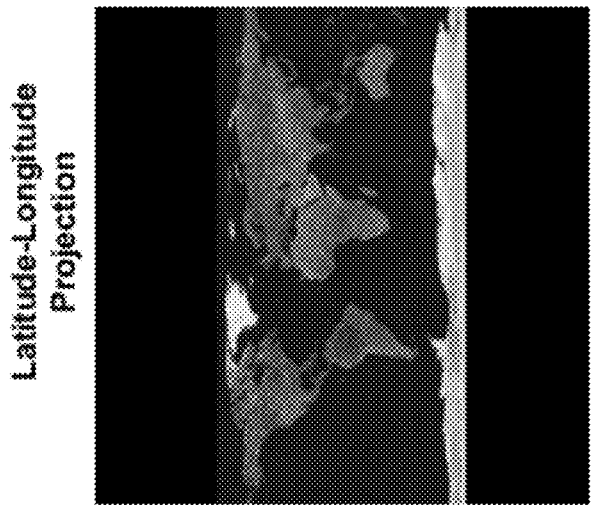
Figure 10A:
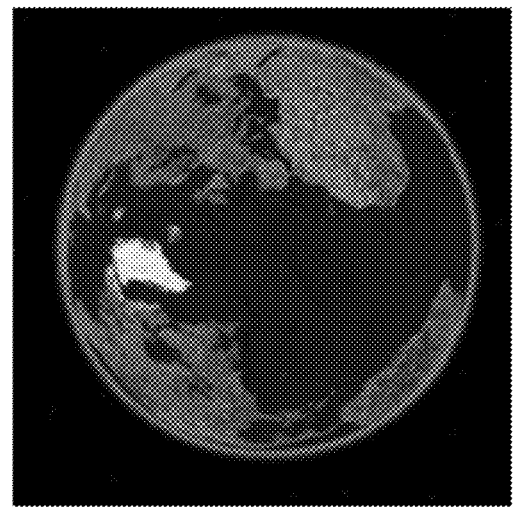

FIGS. 10a through 10c illustrate distortion of imagery when mapping between two coordinate systems. FIG. 10a is an Earth globe, FIG. 10b is latitude-longitude projection and FIG. 10c is a Mercator projection. In some implementations, it is desirable to re-project imagery into a different coordinate system. Images are inherently two-dimensional, so the imagery is preferably stored in a two-dimensional structure for efficiency. The association between points on the Earth and two-dimensional structures is called a projection or a map. There are several types of projections available with various characteristics that can be useful for various image processing applications. Some applications (e.g., 3D mapping tools) may need to store input data in one or more projections but then convert the data to a different projection when producing output. In such applications, a Mercator projection can provide more accurate results than, for example, a latitude-longitude projection, which may distort angles of objects in the imagery. Note how Greenland is distorted in FIG. 10b. Unfortunately, the Mercator projection does not represent the areas close to the Earth poles, as shown in FIG. 10c. Note that the Mercator projection loses space between 85 degrees latitude and each pole.

Converting between projections for large imagery databases is challenging since the division in tiles is different. Several fragments from multiple tiles in the original projection can combine to form a tile in the final projection. For example, one original tile can contribute fragments to multiple output tiles. Since converting between projections can involve distorting the imagery, applications may need to adjust the resolution level during the conversion process so pixels are never "stretched" by more than a predetermined factor (e.g., a factor of 2); otherwise, the resulting images can look distorted (e.g., blurry, stretched, pixilated, etc.).

Figure 11:
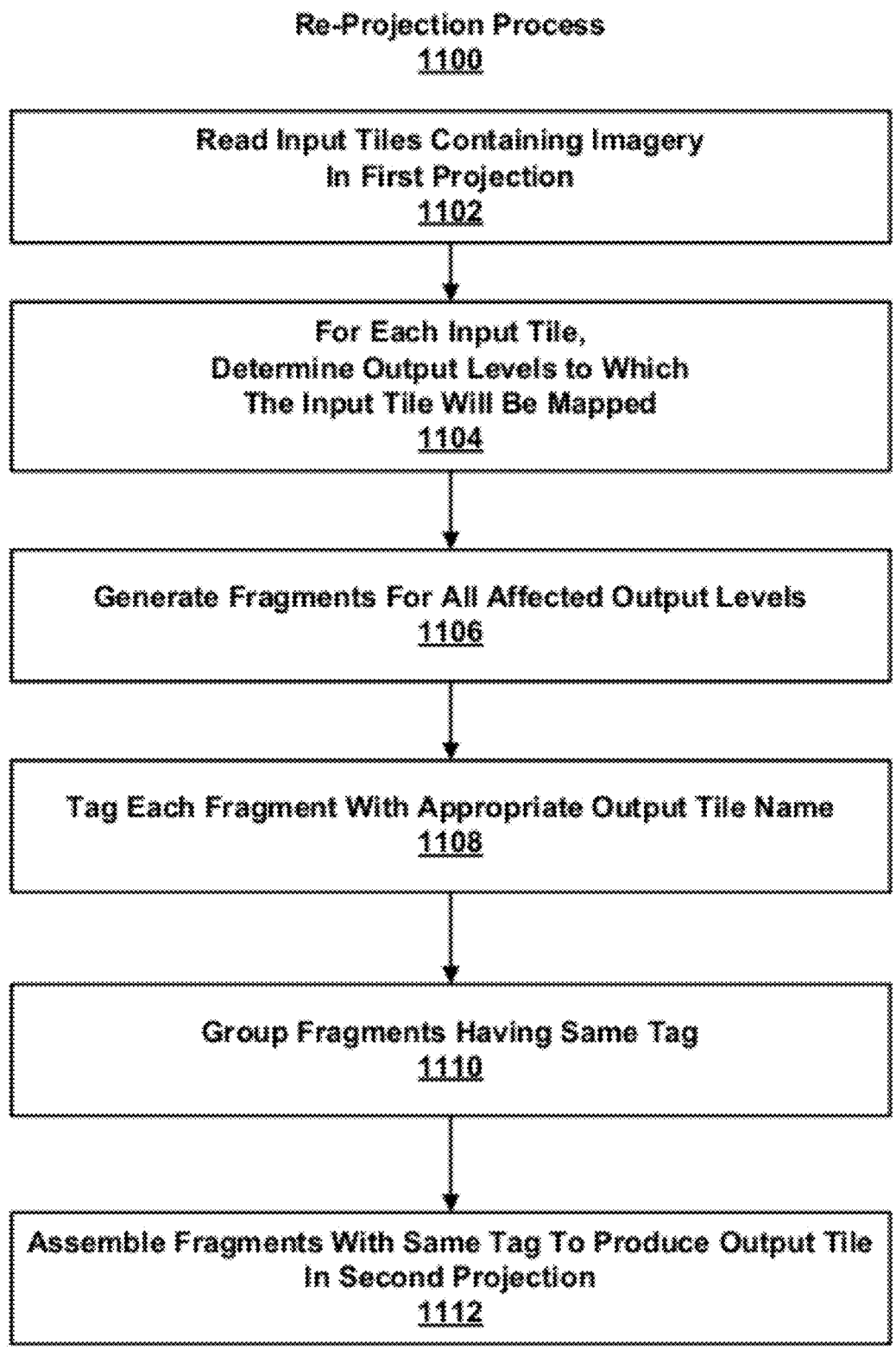
FIG. 11 illustrates an exemplary process for re-projecting Earth imagery in latitude-longitude coordinates to a Mercator projection.

FIG. 11 illustrates an exemplary process 1100 for re-projecting Earth imagery in latitude-longitude coordinates to a Mercator projection. The process 1100 begins by reading input tiles containing imagery (1102). For each input tile, output resolution levels are determined to which the input tile will be mapped (1104). For the particular case of mapping a latitude-longitude projection to a Mercator projection, the mapping is only in the vertical dimension, so there is only vertical stretch. For mappings between other projections, there may be horizontal stretch or shrinkage. In some implementations, the output resolution levels can be determined by approximating the vertical stretch for the whole tile (e.g., 2.71), then choosing a "zoom down" factor that will counter-balance that stretch. For one resolution level up, the tile can be minified by a factor of two in each dimension of the tile. For two resolution levels up, the tile can be minified by a factor of four in each dimension, and so forth. For example, if the stretch for a tile near the poles is approximately 1:9, the output can be zoomed down three levels, or equivalently, shrink the tile by a factor of 8, resulting in a vertical stretch factor of 9/8 and a horizontal shrink factor of 1/8. For better results, the input tile can also produce imagery at one level coarser, with overall factors 9/16 and 1/16.

Once the output levels are determined, then tile fragments are generated for the output levels (1106). This can be conceptualized as stretching the input tile according to the Mercator re-projection formula, then minifying it by each of the factors of the formula to produce several minified versions. For example, for a magnification of 2, a 2×2 box of input pixels can be transformed into a 1×2.71 box by minifying horizontally and stretching vertically. A box filter can be used on each horizontal row of pixels, and the filtered results can be interpolated vertically. For a magnification factor of 4, a 4×4 box of input pixels will map to a 1×2.71 box in output space. Or equivalently, one output pixel receives contributions from 4×1.476 input pixels. An average of the pixels in a 4×2 box can be used. The minified versions can be intersected with the output tile boundaries on those output levels. In practice, the needed fragments can be created as empty images with the proper dimensions, then filled pixel by pixel. For each pixel in an output fragment, the input pixels that contribute to the output pixel are averaged together to fill the output pixel.

Each fragment is tagged with the label or name of its corresponding output tile (1108) and sorted so that fragments with the same tag are grouped together (1110). Fragments with the same tag are assembled together to produce the output tile in the Mercator projection (1112). Some fragments may overlap if they are generated from different input levels. In such cases, the fragments generated from higher resolution input levels are placed on top of ones from lower resolution input levels.

In the sorting phase, some overlapping fragments may end up completely obscured. This condition can be detected using a pre-pass optimization process. The optimization process performs a mock transformation on the input tile and computes fragment dimensions without filling the fragments with pixels. These hidden fragments can be tagged with a special marker (e.g., a marker in a table in the data structure 312) so that the pixel filling step can be skipped.

Various modifications may be made to the disclosed implementations and still be within the scope of the following claims.

What is claimed is:

1. A method performed by one or more computers, the method comprising:
   receiving a plurality of input tiles of first imagery, the first imagery being in a first projection;
   generating, from each of the plurality of input tiles of first imagery, one or more respective fragments for each of one or more output resolution levels, each fragment being a re-projection of imagery from the first projection to a second projection at the respective output resolution level, including:
      approximating vertical stretch for each tile at each respective output resolution level, and
      selecting a zoom factor for counter-balancing the vertical stretch;
   tagging each fragment with a tag identifying an output tile and an output resolution level to which the fragment will contribute imagery;
   storing the fragments on multiple storage subsystems, wherein all fragments having a same tag are stored on a same storage subsystem; and
   assembling fragments with the same tag to produce output tiles in the second projection for each of the one or more output resolution levels.

2. The method of claim 1, where the first projection is a latitude-longitude projection and the second projection is a Mercator projection.

3. The method of claim 1, wherein assembling fragments with the same tag to produce output tiles in the second projection comprises obtaining the all the fragments that are tagged with a first tag from one of the multiple storage subsystems.

4. The method of claim 1, wherein the first imagery is geo-located imagery.

5. A computer program product, encoded on one or more non-transitory computer storage media, comprising instructions that when executed by one or more computers cause the one or more computers to perform operations comprising:
   receiving a plurality of input tiles of first imagery, the first imagery being in a first projection;
   generating, from each of the plurality of input tiles of first imagery, one or more respective fragments for each of one or more output resolution levels, each fragment being a re-projection of imagery from the first projection to a second projection at the respective output resolution level, including:

approximating vertical stretch for each tile at each respective output resolution level, and selecting a zoom factor for counter-balancing the vertical stretch;

tagging each fragment with a tag identifying an output tile and an output resolution level to which the fragment will contribute imagery;

storing the fragments on multiple storage subsystems, wherein all fragments having a same tag are stored on a same storage subsystem; and assembling fragments with the same tag to produce output tiles in the second projection for each of the one or more output resolution levels.

6. The computer program product of claim 5, where the first projection is a latitude-longitude projection and the second projection is a Mercator projection.

7. The computer program product of claim 5, wherein assembling fragments with the same tag to produce output tiles in the second projection comprises obtaining the all the fragments that are tagged with a first tag from one of the multiple storage subsystems.

8. The computer program product of claim 5, wherein the first imagery is geo-located imagery.

9. A method performed by one or more computers, the method comprising:

receiving a plurality of input tiles of first imagery, the first imagery being a first projection;

generating, from each of the plurality of input tiles of first imagery, one or more respective fragments for each of one or more output resolution levels, each fragment being a re-projection of imagery from the first projection to a second projection at the respective output resolution level, including:

approximating vertical stretch for each tile at each respective output resolution level, and selecting a zoom factor for counter-balancing the vertical stretch;

associating each fragment with an output tile and an output resolution level to which the fragment will contribute imagery;

storing the fragments on multiple storage subsystems, including storing each fragment associated with a particular output tile on a same storage subsystem as all other fragments associated with the particular output tile; and assembling fragments associated with the particular output tile to produce second imagery in the second projection for the particular output tile.

10. The method of claim 9, wherein the first projection is a latitude-longitude projection and the second projection is a Mercator projection.

11. The method of claim 9, wherein assembling fragments associated with the particular output tile to produce second imagery in the second projection for the particular output tile comprises obtaining the all the fragments that are associated with the particular output tile from one of the multiple storage subsystems.

12. The system of claim 9, wherein the first imagery is geo-located imagery.

13. A system comprising:

one or more computers and one or more storage devices storing instructions that are operable, when executed by the one or more computers, to cause the one or more computers to perform operations comprising:

receiving a plurality of input tiles of first imagery, the first imagery being in a first projection;

generating, from each of the plurality of input tiles, one or more respective fragments for each of one or more output resolution levels, each fragment being a re-projection of imagery from the first projection to a second projection at the respective output resolution level, including:

approximating vertical stretch for each tile at each respective output resolution level, and selecting a zoom factor for counter-balancing the vertical stretch;

tagging each fragment with a tag identifying an output tile and an output resolution level to which the fragment will contribute imagery;

storing the fragments on multiple storage subsystems, wherein all fragments having a same tag are stored on a same storage subsystem; and assembling fragments with the same tag to produce output tiles in the second projection for each of the one or more output resolution levels.

14. The system of claim 13, wherein the first projection is a latitude-longitude projection and the second projection is a Mercator projection.

15. The system of claim 13, wherein assembling fragments with the same tag to produce output tiles in the second projection comprises obtaining the all the fragments that are tagged with the first tag from one of the multiple storage subsystems.

16. A system comprising:

one or more computers and one or more storage devices storing instructions that are operable, when executed by the one or more computers, to cause the one or more computers to perform operations comprising:

receiving a plurality of input tiles of first imagery, the first imagery being in a first projection;

generating, from each of the plurality of input tiles, one or more respective fragments for each of one or more output resolution levels, each fragment being a re-projection of imagery from the first projection to a second projection at the respective output resolution level, including:

approximating vertical stretch for each tile at each respective output resolution level, and selecting a zoom factor for counter-balancing the vertical stretch;

associating each fragment with an output tile on an output resolution level to which the fragment will contribute imagery;

storing the fragments on multiple storage subsystems, including storing each fragment associated with a particular output tile on a same storage subsystem as all other fragments associated with the particular output tile; and assembling fragments associated with the particular output tile to produce second imagery in the second projection for the particular output tile.

17. The system of claim 16, wherein the first projection is a latitude-longitude projection and the second projection is a Mercator projection.

18. The system of claim 16, wherein assembling fragments associated with the particular output tile to produce second imagery in the second projection for the particular output tile comprises obtaining the all the fragments that are associated with the particular output tile from one of the multiple storage subsystems.

* * * * *

UNITED STATES PATENT AND TRADEMARK OFFICE
CERTIFICATE OF CORRECTION

| | | |
|---|---|---|
| PATENT NO. | : 8,346,016 B1 | |
| APPLICATION NO. | : 13/159216 | |
| DATED | : January 1, 2013 | |
| INVENTOR(S) | : Stephen D. Zelinka, Emil C. Praun and Chikai J. Ohazama | |

It is certified that error appears in the above-identified patent and that said Letters Patent is hereby corrected as shown below:

Column 10, Line 51 at Claim 3; replace:
 "jection comprises obtaining the all the fragments that are" with
-- jection comprises obtaining all the fragments that are --

Column 11, Line 19 at Claim 7; replace:
 "tiles in the second projection comprises obtaining the all the" with
-- tiles in the second projection comprises obtaining all the --

Column 11, Line 55 at Claim 11; replace:
 "comprises obtaining the all the fragments that are associated" with
-- comprises obtaining all the fragments that are associated --

Column 12, Line 25 at Claim 15; replace:
 "jection comprises obtaining the all the fragments that are" with
-- jection comprises obtaining all the fragments that are --

Column 12, Line 26 at Claim 15; replace:
 "tagged with the first tag from one of the multiple storage" with
-- tagged with a first tag from one of the multiple storage --

Column 12, Line 62 at Claim 18; replace:
 "comprises obtaining the all the fragments that are associated" with
-- comprises obtaining all the fragments that are associated --

Signed and Sealed this
Nineteenth Day of March, 2013

Teresa Stanek Rea
*Acting Director of the United States Patent and Trademark Office*